United States Patent
Faustino et al.

(10) Patent No.: US 11,832,147 B2
(45) Date of Patent: Nov. 28, 2023

(54) PROFILING LOCATION INFORMATION AND NETWORK TRAFFIC DENSITY FROM TELEMETRY DATA

(71) Applicant: T-Mobile USA, Inc., Bellevue, WA (US)

(72) Inventors: Narciso Faustino, McKinney, TX (US); Kevin Hinson, Seattle, WA (US); Jie Hui, Mercer Island, WA (US); Antoine Tran, Bellevue, WA (US); Bryan Yang, Seattle, WA (US); Doru Culiac, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/192,382

(22) Filed: Mar. 4, 2021

(65) Prior Publication Data

US 2021/0337354 A1  Oct. 28, 2021

Related U.S. Application Data

(60) Provisional application No. 63/013,976, filed on Apr. 22, 2020.

(51) Int. Cl.
*H04W 4/029* (2018.01)
*G01S 5/00* (2006.01)

(52) U.S. Cl.
CPC ........... *H04W 4/029* (2018.02); *G01S 5/0018* (2013.01)

(58) Field of Classification Search
None
See application file for complete search history.

(56) References Cited

U.S. PATENT DOCUMENTS

| | | | |
|---|---|---|---|
| 8,526,368 B2 | 9/2013 | Finlow-Bates et al. | |
| 8,559,975 B2 | 10/2013 | Lin et al. | |
| 9,301,100 B1 | 3/2016 | Jampani et al. | |
| 10,176,718 B1 | 1/2019 | Mazuir et al. | |
| 11,069,082 B1 | 7/2021 | Afrouzi et al. | |
| 2008/0281839 A1 | 11/2008 | Bevan et al. | |
| 2012/0072110 A1 | 3/2012 | Venkatraman | |
| 2012/0136623 A1 | 5/2012 | Edge et al. | |
| 2012/0149388 A1* | 6/2012 | West | H04W 4/02 455/456.1 |

(Continued)

FOREIGN PATENT DOCUMENTS

| | | | |
|---|---|---|---|
| CA | 3065721 C | 8/2022 | |
| EP | 1115262 A1 * | 7/2001 | ............ H04W 16/18 |
| GB | 2574602 A | 12/2019 | |

OTHER PUBLICATIONS

U.S. Appl. No. 17/074,279, Office Action dated Nov. 17, 2021, 80 pages.

(Continued)

*Primary Examiner* — Adolf Dsouza
(74) *Attorney, Agent, or Firm* — Han Santos, PLLC (57) ABSTRACT

A telemetry data computing engine may receive the telemetry data of a user device, via a network, and it may apply a machine learning algorithm to at least one telemetry data and generate a predicted location for the user device. The predicted location may be used to generate a location pattern for the user device and a user device profile for the user device. The user device profile may be routed to the wireless carrier core network.

20 Claims, 4 Drawing Sheets

(56) References Cited

U.S. PATENT DOCUMENTS

| | | |
|---|---|---|
| 2012/0224770 A1 | 9/2012 | Strassenburg-Kleciak |
| 2014/0244163 A1 | 8/2014 | Zhao et al. |
| 2014/0274151 A1 | 9/2014 | Pattabiraman et al. |
| 2015/0043325 A1 | 2/2015 | Tsukamoto et al. |
| 2016/0127209 A1 | 5/2016 | Singh et al. |
| 2016/0302050 A1 | 10/2016 | Blando et al. |
| 2017/0013409 A1 | 1/2017 | Cerchio et al. |
| 2017/0300973 A1 | 10/2017 | Jones et al. |
| 2017/0318422 A1 | 11/2017 | Kokkonen |
| 2017/0366943 A1 | 12/2017 | Yoon et al. |
| 2018/0091946 A1 | 3/2018 | Venkatraman et al. |
| 2018/0109921 A1 | 4/2018 | Cerchio et al. |
| 2018/0180706 A1 | 6/2018 | Li et al. |
| 2019/0182627 A1 | 6/2019 | Thoresen et al. |
| 2019/0375094 A1 | 12/2019 | Kim et al. |
| 2020/0018812 A1 | 1/2020 | Lindquist et al. |
| 2020/0228943 A1 | 7/2020 | Martin et al. |
| 2021/0063163 A1 | 3/2021 | Huberman et al. |
| 2021/0279417 A1 | 9/2021 | Delaney |

OTHER PUBLICATIONS

U.S. Appl. No. 17/183,715, Office Action dated Jan. 4, 2022, 27 pages.

Pradhan, et al., "(Stable) virtual landmarks: Spatial dropbox to enhance retail experience", 2014 Sixth International Conference on Communication Systems and Networks (COMSNETS), Bangalore, 2014, pp. 1-8.

Davidson, P. and R. Piche, "A Survey of Selected Indoor Positioning Methods for Smartphones," IEEE Communications Surveys & Tutorials, 2016, 24 pages. https://tutcris.tut.fi/portal/files/11073461/main_2_column.pdf.

Jang, Beakcheol and Hyunjung Kim, "Indoor Positioning Technologies Without Offline Fingerprinting Map: A Survey," IEEE Communications Surveys & Tutorials ( vol. 21,Issue: 1, Firstquarter 2019), 21 pages. https://ieeexplore.ieee.org/abstract/document/8451859.

Langlois, et al., "Indoor Localization with Smartphones: Harnessing the Sensor Suite i n Your Pocket," IEEE Consumer Electronics Magazine ( vol. 6, Issue: 4, Oct. 2017), 1 page https://ieeexplore.ieee.org/document/8048717.

Simultaneous localization and mapping (2020), 8 pages. https://en.wikipedia.org/wiki/Simultaneous_localization_and_mapping.

Jiang et al,. "Autonomous Robotic Monitoring of Underground Cable Systems," 12th International Conference on Advanced Robotics, Sep. 2005, pp. 673-679.

Sen, et al., "Avoiding multipath to revive inbuilding WiFi localization," ACM MobiSys 2013, 14 pages.

Laput, et al., "EMSense: Touch Recognition of Uninstrumented, Electrical and Electromechanical Objects," ACM User Interface Software and Technology Symposium, Nov. 8-11, 2015, 10 pages.

Roy, et al., "I am a smartphone and I can tell my user's walking direction", ACM MobiSys 2014, 14 pages.

Li et al., "ID-Match: A Hybrid Computer Vision and RFID System for Recognizing Individuals in Groups," ACM Conference on Human Factors in Computing Systems (CHI), May 7-12, 2016, 12 pages.

Li etl al., "IDSense: A Human Object Interaction Detection System Based on Passive UHF RFID," ACM Conference on Human Factors in Computing Systems (CHI), Apr. 18-24, 2015, 10 pages.

Shu, et al., "Last-Mile Navigation Using Smartphones," ACM MobiCom 2018, 13 pages.

Nang, et al., "No need to war-drive: unsupervised indoor localization," ACM MobiSys 2012, 14 pages.

Mariakakis et al., "Sail: Single access point-based indoor localization," ACM MobiSys 2014, 14 pages.

Pradhan, et al., "Smartphone-based Acoustic Indoor Space Mapping," Proc. ACM Interact. Mob. Wearable Ubiquitous Technol 2, 2, Article 75 (Jun. 2018), 26 pages.

Wang, et al., "Indoor-Outdoor Detection Using a Smart Phone Sensor," Sensors (Basel). Oct. 2016; 16(10): 1563, 24 pages. https://www.ncbi.nlm.nih.gov/pmc/articles/PMC5087352/.

U.S. Appl. No. 17/074,279, Final Office Action dated Apr. 20, 2022, 76 pages.

U.S. Appl. No. 17/074,279, Notice of Allowance dated Jun. 21, 2022, 87 pages.

U.S. Appl. No. 17/074,279, Supplemental Notice of Allowance dated Jul. 6, 2022, 10 pages.

U.S. Appl. No. 17/183,715, Notice of Allowance dated May 4, 2022, 18 pages.

U.S. Appl. No. 17/183,715, Notice of Allowance dated Jun. 13, 2022, 17 pages.

U.S. Appl. No. 17/074,279, Office Action dated Nov. 10, 2011, 97 pages.

U.S. Appl. No. 17/225,841, Office Action dated Sep. 23, 2022, 73 pages.

U.S. Appl. No. 17/225,841, Final Office Action dated Feb. 14, 2023, 61 pages.

U.S. Appl. No. 17/225,937, Office Action dated Feb. 3, 2023, 66 pages.

U.S. Appl. No. 17/074,279, Notice of Allowance dated Apr. 26, 2023, 113 pages.

U.S. Appl. No. 17/967,798, Notice of Allowance dated Apr. 13, 2023, 27 pages.

U.S. Appl. No. 17/225,841, Non Final Office Action dated Jun. 22, 2023, 73 pages.

U.S. Appl. No. 17/074,279, Notice of Allowability dated Jul. 20, 2023, 72 pages.

U.S. Appl. No. 17/225,937, Final Office Action dated Aug. 17, 2023, 33 pages.

U.S. Appl. No. 17/967,798, Notice of Allowance dated Jul. 20, 2023, 20 pages.

\* cited by examiner

PROFILING LOCATION INFORMATION AND NETWORK TRAFFIC DENSITY FROM TELEMETRY DATA

PRIORITY APPLICATION

This application claims the benefit of and priority to U.S. Provisional Application No. 63/013,976, filed Apr. 22, 2020, the entire contents of which are incorporated herein by reference.

BACKGROUND

The deployment of a new wireless network of a wireless carrier may necessitate that proposed locations for new base station nodes be identified and their locations are dependent on the wireless carrier network traffic. Proposed locations of base station nodes are prioritized in areas and locations where people are moving to or traveling through, where the wireless carrier experiences demand from network traffic. To improve the operation or efficiency of the network, the wireless carrier must be able to identify and predict the locations and time of dense wireless network traffic.

In many indoor locations, such as malls, event centers, clustered apartments, etc., there is a lack of wireless signal penetration, or the user devices may be located in global positioning system (GPS) denied areas, and the localization of user devices can be difficult or not feasible. In these cases, the wireless carrier's ability to reliably and accurately monitor the wireless carrier network traffic and collect accurate data on user device locations may be impaired. Without an ability to accurately determine the user device location, in real time, the wireless carrier may not have a true picture of the user device network traffic and may not be able to accurately predict the network traffic density of user devices. As a result, the wireless carrier may lack the data to predict potential locations for proposed base station nodes and expand the wireless carrier network.

The challenges posed by the current technology in predicting and confirming locations for a user device, in real time, may significantly impact the deployment of proposed base station nodes and expansion of wireless carrier networks or may cause the wireless carrier networks to perform at levels that are lower than initially designed.

BRIEF DESCRIPTION OF THE DRAWINGS

The detailed description is depicted with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for implementing a user device telemetry data management tool to receive and analyze telemetry data sets associated with user devices, which in turn may be used to accurately predict the wireless carrier network traffic density and network usage by the user devices in real time. The user device telemetry data management tool may establish the user device location from at least one telemetry data set. In example embodiments, the telemetry data set results in a determination of the user device location. In other example embodiments, the telemetry data set indicates connectivity to a specific wireless device, which in turn, indicates an actual or probable location of the user device. In other example embodiments, multiple telemetry data sets that provide direct or indirect information about the connectivity and location of the user device over time, are used to predict or determine current and/or future locations and movement behavior patterns of the user device.

The user device telemetry data management tool may include a computing device that is connected to the core network of a wireless carrier and may receive at least one telemetry data set for the user device. The telemetry data sets may include information that identifies critical features of one or more conditions that lead to the location of the user device in real time. Examples of critical features of the telemetry data sets that can be useful for establishing the user device location include GPS coordinates, multilateration (MLAT) of radio signals between multiple base stations of the wireless carrier, identification and addressing data of Internet of Things (IoT) devices, identification and data of wireless access points, any combination of these telemetry data sets, or any other communication data of the user device that identifies a location of the user device. MLAT is a technique by which a user device location can be established from the measurement of signal strength between the user device and multiple base station nodes with known locations. Identification of wireless access points, IoT devices, and other Internet-connected devices may be established from the Internet Protocol (IP) addressing information assigned to the device and an associated physically known location.

The user device telemetry data management tool may identify and analyze specific telemetry data sets, and then label the telemetry data with the location of the user device in real time. Such labels, as generated by the telemetry data management tool, may be home, work, gym, etc. For example, a user device telemetry data set that is associated with the user device being communicatively connected to a specific Wi-Fi access point and/or a specific base station may be labeled as a subscriber's home. Alternatively, the user device telemetry data set that is associated with the user device being communicatively connected to a specific set of wireless access points may be labeled as the subscriber's place of work. The user device telemetry data management tool may integrate a pattern recognition model that sorts the data and generates behavior patterns that identify the location of the user device at specific dates and times. For example, the user device telemetry data management tool may generate a behavior pattern for the user device which lists the time frames and locations for the user device. In example embodiments, one or more behavior patterns can be based on telemetry data sets that include connectivity information or communication activity of the user device, that in turn indicate or correlate with one or more physical locations of the user device. For example, if the user device employs specific software applications and/or consumes specific types of data when at a particular location (such as connections to video game consoles, exercise equipment, and so forth), then the telemetry data regarding that activity can indicate a physical location for the user device. Additional data that can be taken into account to discern or determine a user device location can include scheduled appointments in an electronic calendar, shared with the telemetry data management tool in accordance with preferences and permissions.

In various embodiments, the user device telemetry data management tool may build a profile for the user device that is based at least on behavior patterns determined from the telemetry data sets and enable the wireless carrier to locate the user device in real time to estimate the wireless carrier network traffic in a coverage area in which the user device is located.

Example Network Architecture

Figure 1:
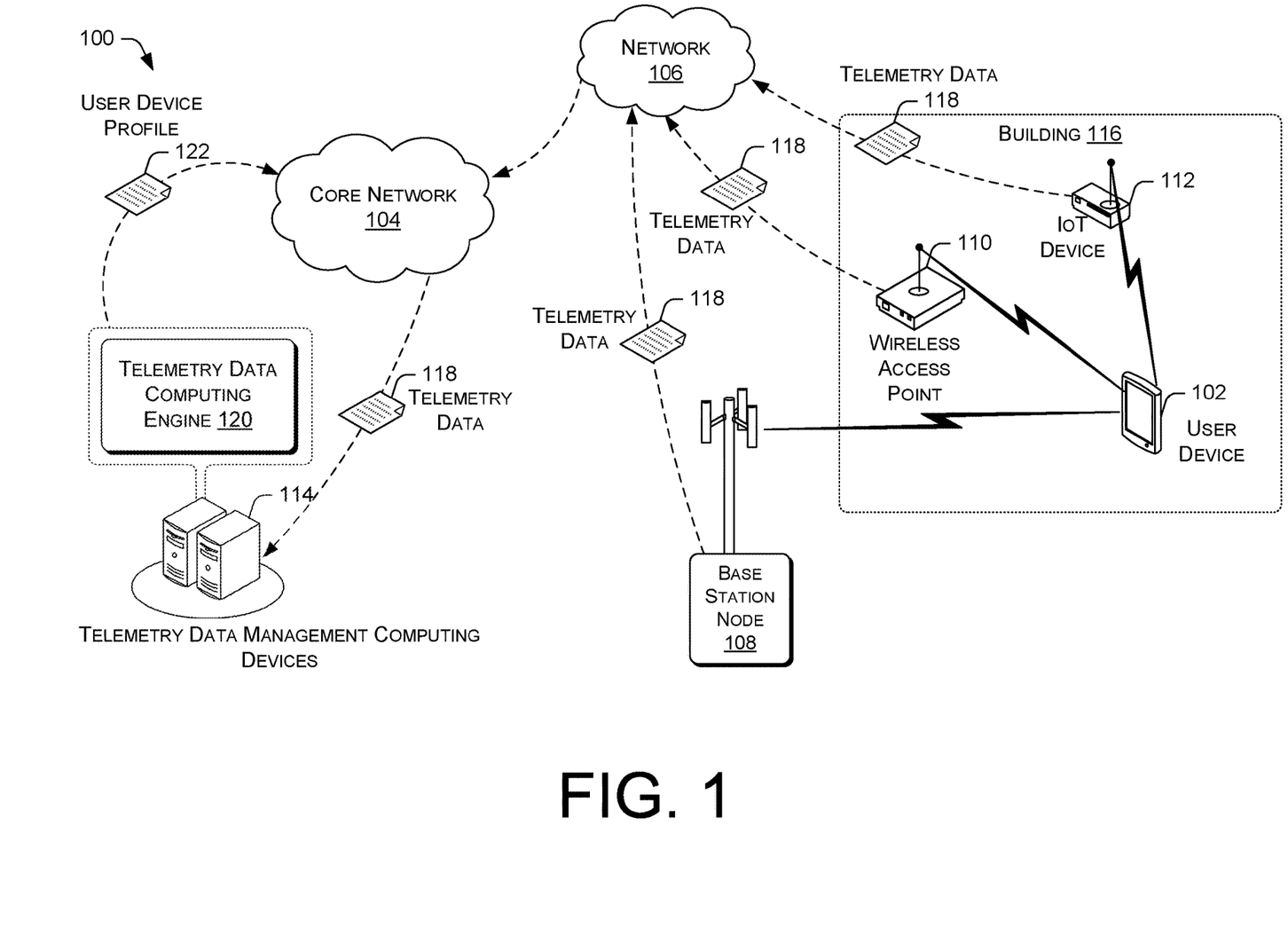
FIG. 1 illustrates an example architecture for determining the profiling location information and network density based at least on telemetry data.

FIG. 1 illustrates an example network architecture of a wireless carrier network for determining profiling location information and network traffic density from telemetry data. The wireless carrier network may provide telecommunication and data communication in accordance with one or more technical standards, such as Enhanced Data Rates for GSM Evolution (EDGE), Wideband Code Division Multiple Access (W-CDMA), High Speed Packet Access (HSPA), Long Term Evolution (LTE), CDMA-2000 (Code Division Multiple Access 2000), Fifth Generation (5G), and/or so forth. The computing environment 100 illustrates a user device 102 communicatively connected to a core network 104 of a wireless carrier, via a network 106 and multiple wireless devices or connection points. The connection points for the user device 102 may be a wireless carrier base station, such as base station node 108, a wireless access point, such wireless access point 110, an IoT device, such as IoT device 112, and so forth. Components of the core network 104 may include telemetry data management computing devices 114 and other network hardware components, devices, and software that manage the data transmission from user devices.

The user device 102 may embody or include a smartphone, a tablet computer, an embedded computer system, or any other device that is capable of using the wireless communication services that are provided by the wireless carrier network. The user device 102 may be located in a building, such as building 116, in an automobile, a stadium, at home, or any other location. No matter where the user device 102 is located, the user device 102 is connected to the core network 104 for the active transmission of voice and data communication.

The quality of the voice and data communication between the user device 102 and the core network 104 may depend on the penetration of the wireless signal between the base station node 108 and the user device 102. Due to physical interference, such as building structural members and walls, like building 116, the quality of the wireless signal between a base station and a user device may be severely degraded to the point that connectivity is unattainable. In these cases, connectivity between the user device 102 and the core network 104 may be established through wireless access points and other wireless devices that are connected to a network and/or the Internet. As such, telemetry data for the user device 102 may be generated with the aid of base station nodes, wireless access points, and any other wireless device or connection point that the user device 102 is communicatively connected to.

In an embodiment, the user device 102 may be communicatively connected to the base station node 108. The base station node 108 of the wireless carrier, is responsible for handling voice and data traffic between user devices, such as user device 102, via air interfaces. Consequently, the base station node 108, may be connected to the core network 104, via the network 106. The core network 104 may provide telecommunication and data communication services to multiple user devices, via multiple base station nodes and networks.

In an alternate embodiment, the user device 102 may be communicatively connected to a wireless access point (WAP), such as wireless access point 110, using wireless signals of Wi-Fi frequencies, frequencies in the infrared spectrum, or any other frequency used to communicate between devices. Consequently, the wireless access point 110 may be communicatively connected to the network 106, which in turn may be connected to the core network 104.

In an additional embodiment, the user device 102 may be communicatively connected to an IoT device, such as IoT device 112, using Industrial, Scientific, Medical (ISM) band frequencies in the Bluetooth or ZigBee wireless technologies. Consequently, the IoT device 112 routes information from the user device 102 to the core network 104, via the network 106.

The network 106 may include one or more of a local area network (LAN), a larger network such as a wide area network (WAN), a mobile telephone network, and/or a collection of networks, or the Internet. The network 106 may be a wired network, a wireless network, or both.

The core network 104 may include components that support voice and data traffic, and it may include hardware devices, such as gateways, servers, switches, and routers. In additional embodiments, the core network 104 may also contain devices that manage telemetry data routed from a user device, such as telemetry data management computing devices 114. The data traffic may be composed of packets of information, some of which may contain data communication, while others may contain user device control and management information. The user device management and control information may be transmitted over the control plane of the network 106. The control plane may be used to transmit dedicated control information for the user device that may contain one or more sets of telemetry data 118, used to locate the user device in real time. In additional embodiments, the telemetry data 118 may be transmitted via dedicated data files generated by the user device and routed to the core network 104.

The telemetry data 118, that is part of the user device data traffic may include GPS coordinates and MLAT of radio signals between multiple base stations of the wireless carrier. MLAT is a triangulation of the wireless signal to/from a user device, while it is communicatively connected to multiple base station nodes by a determination of the wireless signal strength between each base station node and the user device. The telemetry data 118 may also include IP address of wireless access point or IoT devices, a consumer identification of user device location, location of wireless beacons, any combination of thereof, or any other method that identifies the location of the user device.

In one aspect, a beacon may be any wireless device, with a known location, that passes an identifying signal that is registered by the user device 102. For example, a wireless local area network (WLAN), that the user device 102 identifies, but is not communicatively connected to, may be a telemetry point of reference.

Once the user device 102 generates a communication session request with the core network 104 the telemetry data 118 may be routed to the core network 104 via the data traffic generated by the user device 102 and/or dedicated data files. Once received by the core network, the telemetry data 118 may be routed to the telemetry data management computing device 114, and in turn, the telemetry data 118 is processed by a telemetry data computing engine 120.

The telemetry data computing engine 120 may be implemented on one or more computing devices 114 that may be part of the core network 104. Accordingly, the telemetry data computing engine 120 may use a machine-learning approach to analyze the telemetry data 118, and extract characteristics that define the location of the user device 102. The location characteristics of the telemetry data 118 may include GPS coordinates, MLAT of radio signals between multiple base stations of the wireless carrier, identification and addressing data of IoT devices, IP addresses, identification and location data of any wireless access points, any combination of thereof, or any other communication data of the user device that identifies the location of the user device. The telemetry data computing engine 120 may use the location characteristic to derive a location for the user device 102, which may be GPS coordinates, physical site address, or any other coordinate system or identifier that categorizes a user device location. In turn, the user device locations that are stored and analyzed over time may result in the development of location patterns for the user device, from which the wireless carrier can estimate the network traffic density.

The locations and patterns are then used by the telemetry data computing engine 120 to generate a user device profile 122. New telemetry data is generated each time a user device is communicatively connected with the core network 104, so the user device profile 122 is further refined and updated by the receipt of new telemetry data that is associated with the user device 102. Over time, old telemetry data may become irrelevant as it no longer identifies the user device 102 location or is no longer part of the user device 102 location pattern. As such, the telemetry data computing engine 120 may be periodically refreshed with new user device 102 telemetry data as old user device telemetry data is removed, and the user device profile 122 is constantly updated with new location metrics.

Example Server Components

Figure 2:
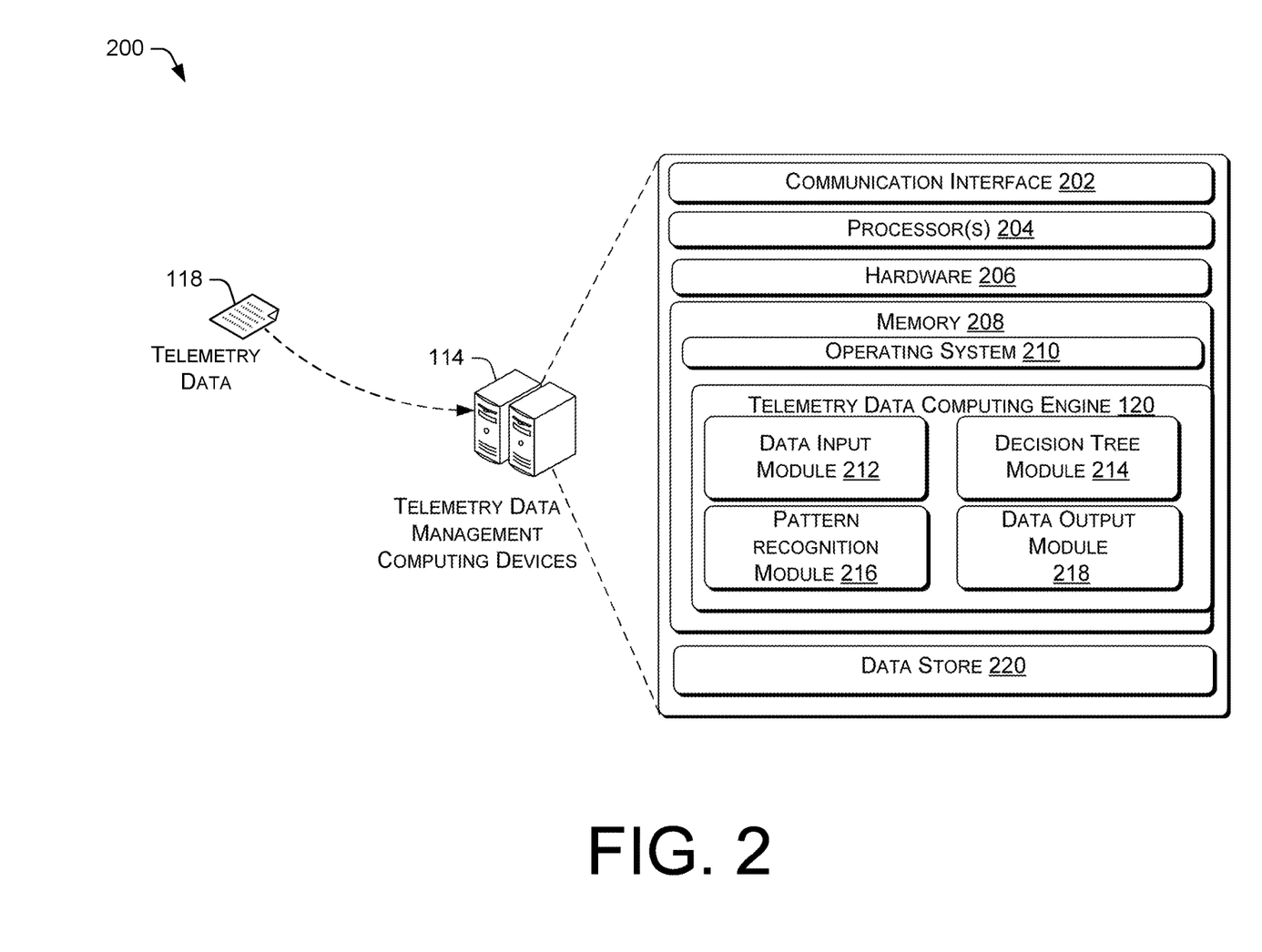
FIG. 2 is a block diagram showing various components of a computing device that determining the profiling location information and network traffic density based at least on telemetry data.

FIG. 2 is a block diagram showing various components of the telemetry data computing engine 122 that implements the profiling location information and network traffic density from telemetry data. The telemetry data computing engine 120 may be implemented on one or more computing devices 114 that are a part of the core network 104. The computing devices 114 may include general purpose computers, such as desktop computers, tablet computers, laptop computers, servers, or other electronic devices that are capable of receive inputs, process the inputs, and generate output data. In other embodiments, the computing devices 114 may be virtual computing devices in the form of virtual machines or software containers that are hosted in a cloud. The computing devices 114 may be equipped with a communication interface 202, one or more processors 204, device hardware 206, and memory 208. The communication interface 202 may include wireless and/or wired communication components that enable the computing devices to transmit data to and receive data from other networked devices via a communication network. The device hardware 206 may include additional hardware that performs user interface, data display, data communication, data storage, and/or other server functions.

The memory 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, Random-Access Memory (RAM), Dynamic Random-Access Memory (DRAM), Read-Only Memory (ROM), Electrically Erasable Programmable Read-Only Memory (EEPROM), flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. Computer-readable storage media do not consist of and are not formed exclusively by, modulated data signals, such as a carrier wave. In contrast, communication media may embody computer-readable instructions, data structures, program modules, or other data in a modulated data signal, such as a carrier wave, or other transmission mechanisms.

The processors 204 and the memory 208 of the computing devices 114 may implement an operating system 210 and the telemetry data computing engine 120. The operating system 210 may include components that enable the computing devices 114 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The telemetry data computing engine 120 may include a data input module 212, a decision tree module 214, a pattern recognition module 216, and a data output module 218. The telemetry data computing engine 120 may also interact with a data store 220. These modules may include routines, program instructions, objects, and/or data structures that perform particular tasks or implement particular abstract data types.

The data input module 212 may receive one or more sets of telemetry data 118 from a user device (e.g., user device 102 of FIG. 1) via a network (e.g., core network 104 of FIG. 1). The user device telemetry data 118 may include user device information that corresponds to a location metric for a user device. Example user device location metrics may include GPS coordinates, MLAT of radio signals between multiple base stations of the wireless carrier, IP addresses, identification and addressing data of IoT devices, identification, and data of any wireless access points, any combination of thereof, or any other communication data of the user device that identifies the location of the user device.

In additional embodiments, the user device may be communicatively connected with multiple wireless devices and the core network may simultaneously receive multiple sets of telemetry data 118 for the user device. For example, the user device may communicatively connect to a base station node and/or an IoT capable device at the same time and both connections may provide telemetry data 118 for the user device. The user device telemetry data 118 may, individually or collectively in groups of two or more, indicate the user device location in real time.

The decision tree module 214 may use machine learning algorithms to generate a user device profile. Various classification schemes (explicitly and/or implicitly trained) and/or systems may be employed by the decision tree module 214 for the generation of the user device profile, such as a probabilistic and/or statistical based analysis. A classifier is a function that maps an input attribute vector, x=(x1, x2, x3, x4, xn) to a confidence that the input belongs to a class, that is, F(x)=confidence (class). Such classification may employ a probabilistic and/or statistically-based analysis to generate a user device profile. A support vector machine is an example of a classifier that may be employed by the decision tree module 214. Other directed and undirected model classification approaches include, e.g., naïve Bayes, Bayesian networks, decision trees, neural networks, fuzzy logic models, and probabilistic classification models providing different patterns of independence may also be employed.

In an example embodiment, the decision tree module 214 may apply a decision tree algorithm to the user device sets of telemetry data 118 to identify critical features of one or more conditions that lead to the location of the user device in real time. While a user device telemetry data 118 provides one data set, a single data set may be ineffective in determining the location of the user device. For example, a telemetry data set of a user device communicatively connected to a base station node of the wireless carrier may not be enough to determine the location of the user device. In such situations, the user device needs to be communicatively connected to multiple base station nodes simultaneously and the MLAT of radio signals between the base station nodes of the wireless carrier may be more effective in determining the location for the user device; however, there are conditions where the user device may not be able to communicatively connect with multiple base station nodes of the wireless carrier. Thus, sets of telemetry data 118 from the user device connection with multiple devices may be a condition to determine the user device location in real time. For example, sets of telemetry data 118 points resulting from the user device being communicatively connected to a base station of the wireless carrier and an IoT capable device may improve the ability of the telemetry data computing engine 120 to determine the user device location in real time.

One difficulty in generating a deterministic location for a user device and a user device profile is that user devices are not necessarily static. User devices are typically mobile and the spectrum of a user device location may be local or may extend several cities. For example, a user device may be moved around a neighborhood or it may regularly travel between cities. To address the wide range of dynamic location changes, the decision tree module 214 may generate an initial user device location that is based on training data. The training data may be collected from different sources, and it may include older telemetry data for the user device, locations for base station nodes, user device location software, and so forth.

The training data may be supplemented with telemetry data extrapolated from the base station nodes that the user device is communicatively connected with the most. Specifically, the decision tree module 214 may obtain data, extrapolate such data, and cluster the data based on location connections with the base station nodes of the wireless carrier. As such, the decision tree module 214 may extrapolate and update user device locations. In practice, as real-world user device locations are collected, the decision tree module 214 may preferentially use real-world data over training data. Accordingly, the use of training data by the decision tree module 214 may be phased out or updated as historical data is collected.

Accordingly, the decision tree module 214 uses one or more sets of telemetry data 118 from multiple wireless devices as an input to a decision tree machine learning algorithm in order to locate the user device in real time. Starting from sets of telemetry data 118 for the user device, a decision tree machine learning algorithm may find a first location for the user device and a corresponding first-time value. The decision tree module 214 may define this as a first data point for establishing the user device location in real time. From sets of updated telemetry data 118, the decision tree algorithm may find a second location for the user device and a corresponding second time value, which may define a second data point for establishing the user device location in real time. The relationship between a first data point and a second data point is the creating of a tree leaf in the decision tree. The update in the telemetry data 118 and subsequent change in the relationship between data sets may create new leaf nodes for the decision tree.

Subsequently, the decision tree module 214 may extract and group decision tree leaves by the relationship of data points. The analysis of decision tree leaves of the decision tree may determine a relative location for the user device in real time.

The pattern recognition module 216 may indicate the user device behavior over time and a pattern for the user device location in real time. Based on the output of the decision tree module 214, decision tree leaves may be grouped by data point locations, as established by the decision tree module 214. For example, the pattern recognition module 216, from an enumeration of identical tree leaves between specific times, such as from 8:00 PM to 6:00 AM, may determine that the user device is at a specific location during those times, such as a home. The grouping of tree leaves by data point locations, over time, may form a pattern of the relative location of the user device. The groups may be revised and updated, as the tree leaves of the decision tree change.

The data output module 218 may generate a user device profile for the user device. The user device profile may contain the location predictions of the user device, as a function of time. The user device profile may be updated as the pattern recognition module 216 may detect changes in the relative location of the user device over time. The user device profile may be routed to the core network or any other components of the wireless carrier to aid in the location predictions of wireless carrier base station nodes.

The data store module 220 may store data that are used by the various modules of the telemetry data computing engine 120. The data store module 220 may include one or more databases, such as relational databases, object databases, object-relational databases, and/or key-value databases. In various embodiments, the data store module 220 may store telemetry data sets that are collected from user devices, results of telemetry algorithmic calculations, and user device profiles.

Illustrative Operations

Figure 3:
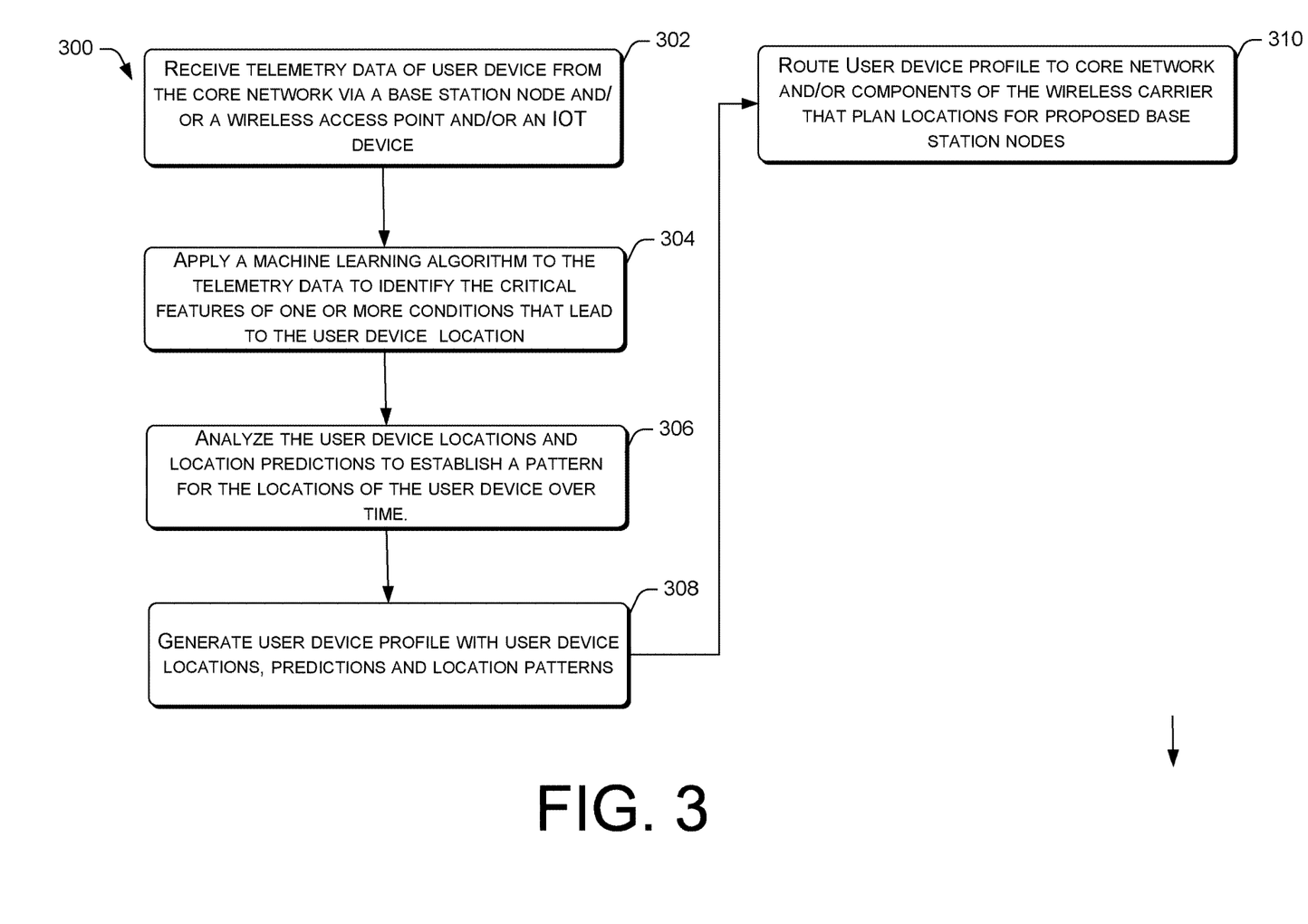
FIG. 3 is a flow diagram of an example process for determining the profiling location information and network traffic density based at least on telemetry data.
Figure 4:
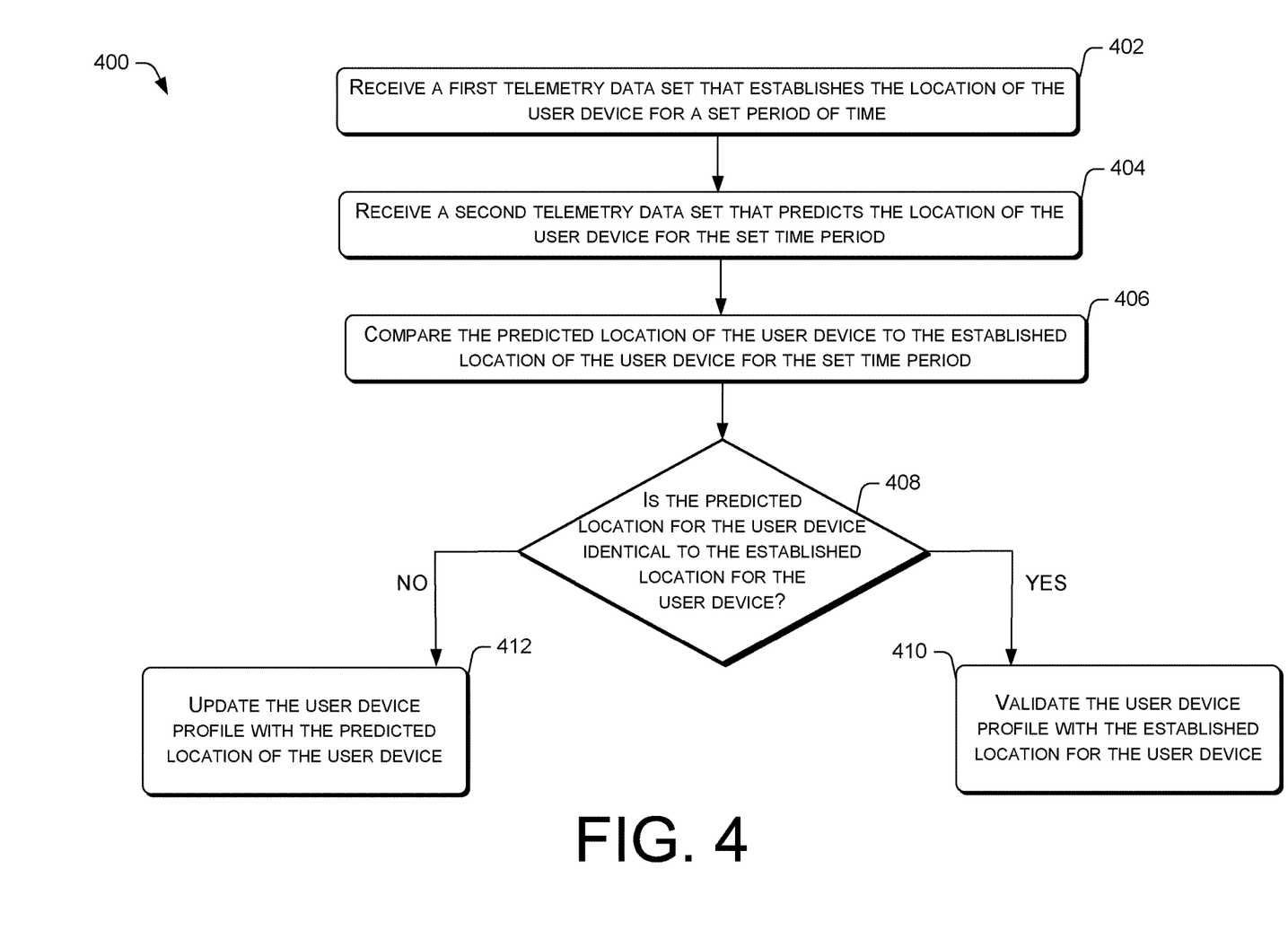
FIG. 4 is a flow diagram of an example process for updating the profiling location information and network traffic density based at least on telemetry data.

FIGS. 3 and 4 present illustrative processes 300 and 400 for implementing the profiling location information and network traffic density from telemetry data to determine real time geolocation of user devices and traffic network density for a given coverage area. Each of the processes 300 and 400 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like, that perform functions or implement abstract data types. The order in which the operations are described is not intended to be construed as a limitation, and any number of the described blocks can be combined in any order and/or in parallel to implement the process. For discussion purposes, the processes 300 and 400 are described with references to the computing environment 100 of FIG. 1.

FIG. 3 is a flow diagram of an example process for implementing the profiling location information and network traffic density from telemetry data. At block 302, a telemetry data computing engine, via a core network, may receive telemetry data for a user device. The telemetry data may include GPS coordinates, MLAT of radio signals between multiple base stations of the wireless carrier, IP addresses, identification and addressing data of IoT devices, identification and data of any wireless access points, any combination of these telemetry data sets, or any other communication data of the user device that identifies a location of the user device. In an additional embodiment, the telemetry data of the user device may comprise the use of software or web sites that may only be activated in specific known locations (e.g., check-in features, payment or promotional features at retail locations, etc.). The telemetry data may result from the user device being communicatively connected to one or multiple wireless devices. Example wireless devices may include at least one base station node of the wireless carrier, a wireless access point, and/or an IoT device.

At block 304, the telemetry data computing engine may apply a machine learning algorithm to identify critical features in the telemetry data that provide the locations or predicts the location of the user device as a function of time. The connectivity of the user device with wireless devices and base station nodes provides telemetry data points that are used by the telemetry data computing engine to update the user device location in real time.

At block 306, based on the established locations and predictions for the user device, the telemetry data computing engine may establish a pattern for the location of the user device over time. The supply of location data points for the user device provides the basis for updates to the user device location pattern.

At block 308, the telemetry data computing engine may generate a user device profile that contains the location predictions and location patterns over time. The telemetry data management computing devices may store the user device profile for later use and may be updated as new locations and location patterns are established for the user device. Existing user device location data may be purged or phased out as new user device locations and historical location data is collected.

At block 310, the telemetry data computing engine may route the user device profile to the core network or any other component of the wireless carrier network to analyze wireless carrier network traffic patterns. In some aspects, the network traffic patterns may be analyzed with performance indicators to confirm whether or not the user devices in a given coverage area meets the user demands in the coverage area. Additionally, the network traffic patterns may be used to plan the locations of new or supplemental wireless carrier base station nodes or other access points (mobile or stationary) that may be deployed.

FIG. 4 is a flow diagram of an example process 400 for updating the user device profile with location information and telemetry data. At block 402, the telemetry data computing engine may receive a user device established location information for a set time period, that has been established by previous telemetry data. The user device telemetry data may be generated as a result of the user device being communicatively connected to at least one base station node, a wireless access point, and/or an IoT device. The telemetry data may include GPS coordinates, MLAT of radio signals between multiple base stations of the wireless carrier, IP addresses, identification and addressing data of IoT devices, identification and data of any wireless access points, any combination of these telemetry data sets, or any other communication data of the user device that identifies a location of the user device. In an additional embodiment, the telemetry data of the user device may comprise the use of software or websites that may only be activated in specific known locations (e.g., check-in features, payment or promotional features at retail locations, etc.).

At block 404, the telemetry data computing engine may receive a user device's predicted location for the set time period, that has been established by updated telemetry data. The predicted location for the user device may be established by the machine learning algorithm of the telemetry data computing engine from new and/or updated telemetry data generated by the user device or as a result of the user device being communicatively connected to a base station node, a wireless access point, and/or an IoT device.

At block 406, the telemetry data computing engine may compare the established location of the user device for the set time period to the predicted location of the user device for the set time period. The comparison of the established location to the predicted location of the user device determines if the user device has changed locations.

At decision block 408, if the telemetry data computing engine establishes that the established location of the user device is identical to the predicted location of the user device ("yes" at decision block 408), the process 400 may proceed to block 410. If the telemetry data computing engine establishes that the location of the user device is not identical to the predicted location of the user device ("no" at decision block 408), the process 400 may proceed to block 412.

At block 410, the telemetry data computing engine maintains the user device profile, as the predicted location of the user device is unchanged from the established location of the user device for the set time period.

At block 412, the telemetry data computing engine updates the user device profile with the predicted location of the user device for the set time period. As predicted user device locations are added to the user device profile, the existing user device location data may be purged or phased out.

CONCLUSION

Although the subject matter has been described in language specific to the structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media, storing computer-executable instructions that upon execution cause one or more processors to perform acts comprising:

receiving at least one set of telemetry data for a user device that is communicatively connected to a plurality of different types of wireless devices;

applying a machine learning algorithm to identify one or more features in the at least one set of telemetry data that predicts a location of the user device as a function of time, the one or more features identified by the machine learning algorithm including the user device using a software or a website that is only capable of being activated in one or more specific known locations;

generating a predicted location for the user device in real time based at least on the one or more features in the at least one set of telemetry data;

generating a location pattern for the user device based at least on the predicted location of the user device and one or more established locations of the user device that are generated based on previous telemetry data;

generating a user device profile for the user device that includes the location pattern for the user device; and routing the user device profile to a wireless carrier core network for the wireless carrier core network to analyze wireless carrier network traffic patterns that includes the location pattern of the user device.

2. The one or more non-transitory computer-readable media of claim 1, wherein the acts further comprise:

receiving an updated telemetry data for the user device;

applying the machine learning algorithm to the updated telemetry data;

generating an updated predicted location for the user device;

determining whether the predicted location and the updated predicted location are different;

in response to determining that the predicted location and the updated predicted location are different, generating an updated location pattern and an updated user device profile for the user device; and routing the updated user device profile to the wireless carrier core network for the wireless carrier core network to analyze the wireless carrier network traffic patterns that include the updated location pattern of the user device.

3. The one or more non-transitory computer-readable media of claim 1, wherein the telemetry data is a determining data point of a user device location, wherein the determining data point comprises at least one of Global Positioning System (GPS) coordinates, multilateration (MLAT) of radio signals between multiple base stations of a wireless carrier, identification of IoT devices, and identification of a wireless access point.

4. The one or more non-transitory computer-readable media of claim 1, wherein the wireless devices comprise at least one of a base station node, a wireless access point, and an Internet of Things (IoT) device.

5. The one or more non-transitory computer-readable media of claim 1, wherein the location pattern for the user device includes locations of the user device as the function of time for a set time period.

6. The one or more non-transitory computer-readable media of claim 1, wherein the acts further comprise:

determining traffic network density for the predicted location based at least on the generated user device profile that includes the location pattern for the user device.

7. The one or more non-transitory computer-readable media of claim 6, wherein the acts further comprise:

identifying locations of one or more existing base station nodes based at least on the traffic network density; and recommending one or more new locations for installation of at least one additional base station node based at least on the traffic network density.

8. A system comprising:

one or more processors; and memory having instructions stored therein, the instructions, when executed by the one or more processors to perform acts comprising:

receiving at least one set of telemetry data for a user device that is communicatively connected to a plurality of different types of wireless devices;

applying a machine learning algorithm to the at least one set of telemetry data to identify one or more features in the at least one set of telemetry data that predicts a location of the user device as a function of time;

generating a predicted location for the user device in real time, based at least on the one or more features in the at least one set of telemetry data, the one or more features identified by the machine learning algorithm including the user device using a software or a website that is only capable of being activated in one or more specific known locations;

generating a location pattern for the user device based at least on the predicted location of the user device and one or more established locations of the user device that are generated based on previous telemetry data;

generating a user device profile for the user device that includes the location pattern for the user device; and routing the user device profile to a wireless carrier core network for the wireless carrier core network to analyze wireless carrier network traffic patterns that includes the location pattern of the user device.

9. The system of claim 8, wherein the acts further comprise:

receiving an updated telemetry data for the user device;

applying the machine learning algorithm to the updated telemetry data;

generating an updated predicted location for the user device;

determining whether the predicted location and the updated predicted location are different;

in response to determining that the predicted location and the updated predicted location are different, generating an updated location pattern and an updated user device profile for the user device; and routing the updated user device profile to the wireless carrier core network for the wireless carrier core network to analyze the wireless carrier network traffic patterns that include the updated location pattern of the user device.

10. The system of claim 8, wherein the telemetry data is a determining data point of a user device location, wherein the determining data point comprises at least one of Global Positioning System (GPS) coordinates, multilateration (MLAT) of radio signals between multiple base stations of a wireless carrier, identification of IoT devices, and identification of a wireless access point.

11. The system of claim 8, wherein the wireless devices comprise at least one of a base station node, a wireless access point, and an Internet of Things (IoT) device.

12. The system of claim 8, wherein the location pattern for the user device includes locations of the user device as the function of time for a set time period.

13. The system of claim 8, wherein the acts further comprise:

determining traffic network density for the predicted location based at least on the generated user device profile that includes the location pattern for the user device.

14. The system of claim 13, wherein the acts further comprise:
  identifying locations of one or more existing base station nodes based at least on the traffic network density; and
  recommending one or more new locations for installation of at least one additional base station node based at least on the traffic network density.

15. A computer-implemented method, comprising:
  receiving at least one set of telemetry data for a user device that is communicatively connected to a plurality of different types of wireless devices;
  applying a machine learning algorithm to the at least one set of telemetry data to identify one or more features in the at least one set of telemetry data that predicts a location of the user device as a function of time, the one or more features identified by the machine learning algorithm including the user device using a software or a website that is only capable of being activated in one or more specific known locations;
  generating a predicted location for the user device based at least on the one or more features in the at least one set of telemetry data;
  generating a location pattern for the user device based at least on the predicted location of the user device and one or more established locations of the user device that are generated based on previous telemetry data;
  generating a user device profile for the user device that includes the location pattern for the user device; and
  routing user device profile to a wireless carrier core network for the wireless carrier core network to analyze wireless carrier network traffic patterns that includes the location pattern of the user device.

16. The computer-implemented method of claim 15, further comprising:
  receiving an updated telemetry data for the user device;
  applying the machine learning algorithm to the updated telemetry data;
  generating an updated predicted location for the user device;
  determining whether the predicted location and the updated predicted location are different;
  in response to determining that the predicted location and the updated predicted location are different, generating an updated location pattern and an updated user device profile for the user device; and
  routing the updated user device profile to the wireless carrier core network for the wireless carrier core network to analyze wireless carrier network traffic patterns that include the updated location pattern of the user device.

17. The computer-implemented method of claim 15, wherein the telemetry data is a determining data point of a user device location, wherein the determining data point comprises at least one of Global Positioning System (GPS) coordinates, multilateration (MLAT) of radio signals between multiple base stations of a wireless carrier, identification of IoT devices, and identification of a wireless access point.

18. The computer-implemented method of claim 15, wherein the wireless devices comprise at least one of a base station node, a wireless access point, and an Internet of Things (IoT) device.

19. The computer-implemented method of claim 15, wherein the location pattern for the user device includes locations of the user device as the function of time for a set time period.

20. The computer-implemented method of claim 15, further comprising:
  determining traffic network density for the predicted location based at least on the generated user device profile that includes the location pattern for the user device.

* * * * *